US010764384B2

(12) United States Patent
Bandaru et al.

(10) Patent No.: US 10,764,384 B2
(45) Date of Patent: Sep. 1, 2020

(54) CONTROL SYSTEM BASED ON COLLABORATIVE INTERACTION DETECTION AND GRAPH CONSTRUCTION

(71) Applicant: Microsoft Technology Licensing, LLC, Redmond, WA (US)

(72) Inventors: Ravikumar Venkata Seetharama Bandaru, Harrow (GB); Robert L. Davis, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 183 days.

(21) Appl. No.: 15/974,329

(22) Filed: May 8, 2018

(65) Prior Publication Data
US 2019/0349438 A1    Nov. 14, 2019

(51) Int. Cl.
| G06Q 10/10 | (2012.01) |
| H04L 29/08 | (2006.01) |
| H04L 12/18 | (2006.01) |
| H04L 12/58 | (2006.01) |
| G06Q 50/00 | (2012.01) |

(52) U.S. Cl.
CPC ............. *H04L 67/22* (2013.01); *G06Q 10/10* (2013.01); *G06Q 10/101* (2013.01); *G06Q 50/01* (2013.01); *H04L 12/18* (2013.01); *H04L 51/04* (2013.01); *H04L 67/10* (2013.01)

(58) Field of Classification Search
CPC ...... G06Q 10/10; G06Q 10/101; G06Q 50/01; H04L 67/22; H04L 51/04
See application file for complete search history.

(56) References Cited

U.S. PATENT DOCUMENTS

| 8,954,449 | B2 | 2/2015 | Nelson et al. | |
| 9,811,597 | B2 | 11/2017 | Pappas | |
| 9,886,261 | B1 | 2/2018 | Hotchkies | |
| 2004/0088323 | A1 | 5/2004 | Elder et al. | |
| 2004/0088325 | A1* | 5/2004 | Elder | G06Q 10/10 |
| 2011/0213785 | A1 | 9/2011 | Kristiansson et al. | |
| 2013/0132158 | A1 | 5/2013 | L'huillier et al. | |
| 2014/0297837 | A1* | 10/2014 | Agarwal | G06Q 10/101 709/224 |
| 2016/0035046 | A1 | 2/2016 | Gupta et al. | |
| 2016/0335686 | A1 | 11/2016 | Athulurutlrumala et al. | |
| 2017/0192767 | A1 | 7/2017 | Choudhari et al. | |
| 2017/0236081 | A1 | 8/2017 | Grady smith et al. | |

OTHER PUBLICATIONS

"International Search Report and Written Opinion issued in PCT Application No. PCT/US2019/030088", dated Jul. 12, 2019, 10 Pages.

* cited by examiner

*Primary Examiner* — Kyung H Shin
(74) *Attorney, Agent, or Firm* — Christopher J. Volkmann; Kelly, Holt & Christenson, PLLC

(57) ABSTRACT

Collaborative actions among users are detected and an indication of a graph, illustrating those collaborative actions, is generated. Nodes in the graph identify users and connections among nodes are indicative of collaborative actions between users. A connection metric, based upon a number of connections between nodes, is generated for each node, and an inheritance value is also generated for each given node, based upon a connection metric corresponding to other nodes connected to the given node. A centrality metric is generated for each node, and a control signal is generated, to control a user interaction system, based upon the centrality metric.

20 Claims, 11 Drawing Sheets

CONTROL SYSTEM BASED ON COLLABORATIVE INTERACTION DETECTION AND GRAPH CONSTRUCTION

BACKGROUND

Computing systems are currently in wide use. Some computing systems host services that can be used by users of various different tenants. Each tenant can correspond to a different organization, that has a different set of users.

Many organizations are quite large, and have a large number of users. The users may work in different departments, perform different functions, and use the hosted services in different ways. Therefore, it can be difficult to control communication systems to communicate information to various users, based upon the conditions under which those users use the hosted services.

This can result in a number of different scenarios. In one scenario, a communication is controlled to generate communications to a set of users that is overly inclusive. This consumes bandwidth and computing system overhead in generating and transmitting those communications. In another scenario, the control system can be controlled to generate communications to a set of users that is under-inclusive. This can lead to a situation in which users, who would otherwise be intended to receive a communication, do not receive it.

The discussion above is merely provided for general background information and is not intended to be used as an aid in determining the scope of the claimed subject matter.

SUMMARY

Collaborative actions among users are detected and an indication of a graph, illustrating those collaborative actions, is generated. Nodes in the graph identify users and connections among nodes are indicative of collaborative actions between users. A connection metric, based upon a number of connections between nodes, is generated for each node, and an inheritance value is also generated for each given node, based upon a connection metric corresponding to other nodes connected to the given node. A centrality metric is generated for each node, and a control signal is generated, to control a user interaction system, based upon the centrality metric.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
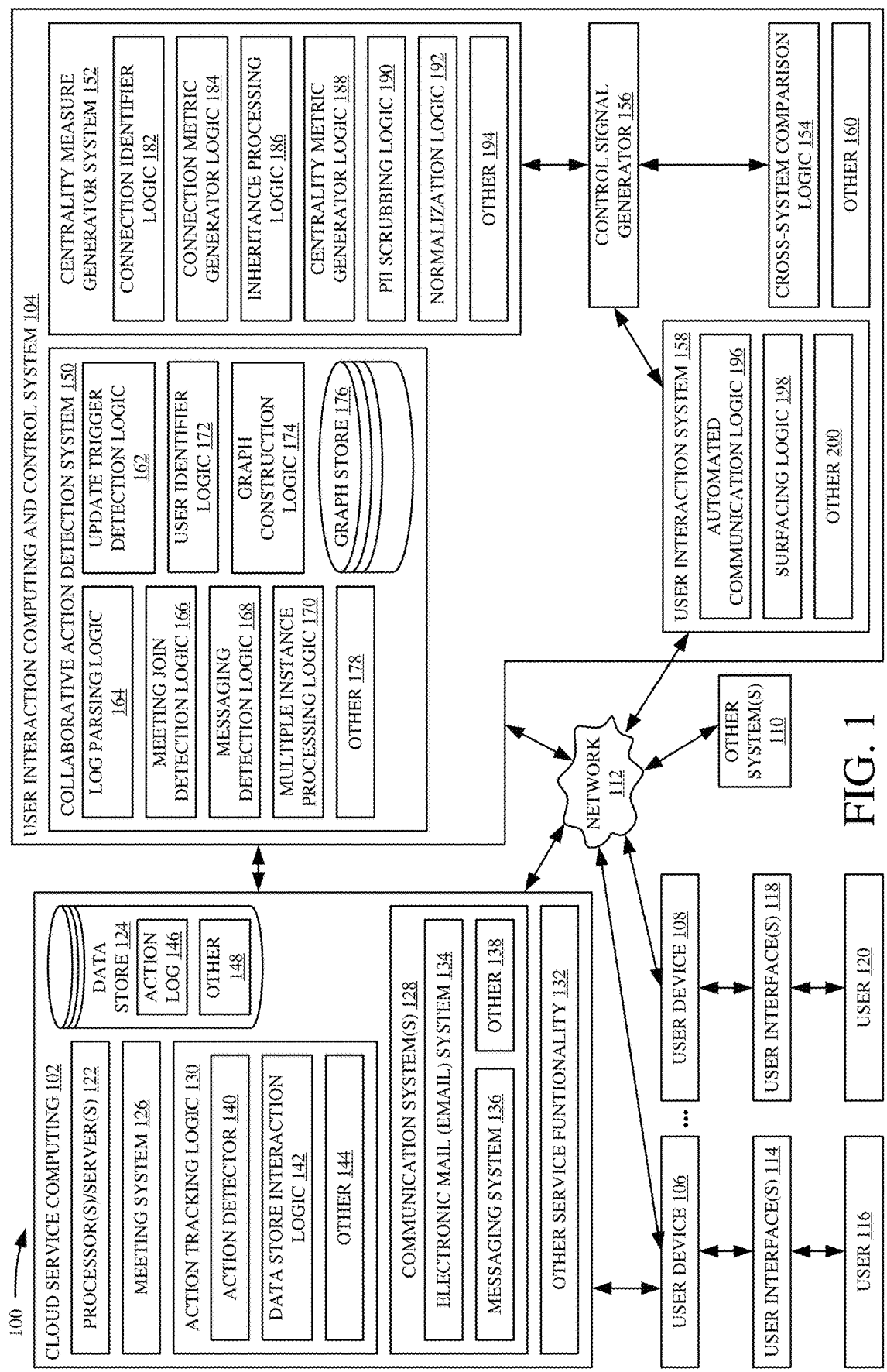
FIG. 1 is a block diagram of one example of a computing system architecture.

FIG. 1 is a block diagram of one example of a computing system architecture 100. Architecture 100 illustratively includes a cloud service computing system 102, user interaction computing and control system 104, user devices 106-108 and other systems 110, all connected to one another either directly, or over network 112. Network 112 can be any of a wide variety of different types of networks, such as a wide area network, a local area network, a near field communication network, a cellular communication network, or any of a wide variety of other networks or combinations of networks.

In the example shown in FIG. 1, user device 106 is shown generating user interfaces 114 for interaction by user 116. User 116 illustratively interacts with user interfaces 114 to control and manipulate user device 106 and some portions of cloud service computing system 102. Similarly, user device 108 is shown generating user interfaces 118 for interaction by user 120. User 120 illustratively interacts with user interfaces 118 in order to control and manipulate user device 108 and portions of cloud service computing system 102. Users 116-120 may be part of a single organization (or tenant). Therefore, they use their user devices 106-108, respectively, in order to use the services hosted by cloud service computing system 102.

In one example, user interaction computing and control system 104 detects interactions of users 116-120, in cloud service computing system 102. It identifies certain of those actions as corresponding to a relatively strong collaboration or connection between the users. It can construct a graph identifying the various connections among the various users 116-120 in the organization or tenant. The graph may have nodes connected by edges. Each node in the graph may represent a user 116-120, and each edge may represent a connection between two users. User interaction computing and control system 104 generates a score for each node, based upon the connections, and can generate a control signal to control interactions with communication systems in cloud service computing system 102, or other systems 110, based upon the metrics generated for each node. Before describing the overall operation of architecture 100 in more detail, a brief description of some of the items in architecture 100, and their operation, will first be provided.

In the example shown in FIG. 1, cloud service computing system 102 illustratively includes one or more processors or servers 122, one or more data stores 124, a meeting system 126, communication system 128, action tracking logic 130, and it can include a wide variety of other service functionality 132. Meeting system 126 illustratively exposes functionality to users 116-120 (such as through a front-end system) that allows users 116-120 to perform meeting operations, such as to send meeting requests and schedule meetings, conference rooms, online meetings, etc. It also illustratively exposes functionality so that an invitee to a meeting may respond to the meeting to accept the invitation, and to actually join the meeting, when the meeting is occurring. For instance, if the meeting is an online meeting, the meeting object that is placed on the user's calendar when the meeting request is accepted may have an actuator that is surfaced on one of user interfaces 114,118 that can be actuated by the corresponding user to join the meeting. The system illustratively detects that and makes a record of that as well.

Communication system 128 can include an electronic mail (e-mail) system 134, a messaging system (such as an instant messaging system) 136, and it can include a wide variety of other communication systems 138. E-mail system 134 illustratively exposes functionality so that users 116 and 120 can perform e-mail operations. The e-mail operations may include authoring, sending, receiving, reading, and deleting e-mail messages. The e-mail operations can include configuring filters, folders, etc. They can also include attaching, opening and deleting attachments. They can include a wide variety of other e-mail operations as well. Messaging system 136 illustratively exposes functionality to users 116 and 120 so that they can send instant messages to one another, read messages, delete messages, etc. The instant messaging functionality can expose functionality to perform a wide variety of other operations as well.

Action tracking logic 130 illustratively includes action detector 140, data store interaction logic 142, and it can include a wide variety of other items 144. Action detector 140 illustratively detects certain actions in cloud service computing system 102 that may indicate a collaboration between different users of system 102 (such as between users 116 and 120). There may be a wide variety of different actions that can be taken where the users interact with one another. However, not all of those actions indicate a collaboration much less a strong collaboration between the users.

By way of example, user 116 may send an e-mail message to users 120.

However, while this indicates that user 116 has attempted to interact with user 120, user 120 may never read the e-mail message or respond to the e-mail message. Thus, the simple act of sending an e-mail message does not indicate a strong collaboration between the users. Similarly, user 116 may send a meeting request to user 120. Again, user 120 may not respond to the meeting request (such as by accepting it or proposing another time), or, even if they do respond, user 120 may not actually attend the meeting. Therefore, in one example, action detector 140 illustratively detects messaging actions among users. For instance, if user 116 sends an instant message to user 120, this tends to indicate a relatively strong collaboration or connection between users 116 and 120. Similarly, if user 120 actually joins a meeting that was organized by user 116, then this indicates a much stronger connection or collaboration between the users than simply sending a meeting request. Therefore, in one example, action detector 140 detects when one user sends an instant message to another user using messaging system 136. It also detects when a user joins a meeting that was organized by another user.

Data store interaction logic 142 illustratively generates a record indicative of those actions, such as an identifier that identifies the users on the sending and receiving ends of the action, as well as the action itself. It may aggregate other metadata as well, such as the day and time when the action was performed, among other things. Logic 142 interacts with data store 124 to store that information in an action log 146. It can interact to store other information 148 as well.

At some point, user interaction computing and control system 104 will access the information stored in action log 146. Thus, user interaction computing and control system 104 illustratively includes collaborative action detection system 150, centrality measure generator system 152, cross-system comparison system 154, control signal generator 156, user interaction system 158, and it can include a wide variety of other items 160. Collaborative action detection system 150 illustratively includes update trigger detection logic 162, log parsing logic 164, meeting join detection logic 166, messaging detection logic 168, multiple instance processing logic 170, user identifier logic 172, graph construction logic 174, graph store 176, and it can include a wide variety of other items 178.

Centrality measure generator system 152 illustratively includes, connection identifier logic 182, connection metric generator logic 184, inheritance processing logic 186, centrality metric generator logic 188, personal identifying information (PII) scrubbing logic 190, normalization logic 192, and it can include a wide variety of other items 194. User interaction system 158, itself, illustratively includes automated communication logic 196, surfacing logic 198, and it can include other items 200.

Collaborative action detection system 150 illustratively accesses the action log 146 and identifies collaborative actions represented in that log and constructs a graph where nodes in the graph represent users and edges in the graph represent connections among those users that are identified based upon the collaborative actions. Thus, update trigger detection logic 162 detects when it is time to construct or update the graph. This can be time-based, such as when an update interval runs, or it can be based on other criteria, such a volume of collaborative actions that have been logged, among other things. When the update trigger is detected, log parsing logic 164 obtains the action log 146 and parses it into the individual actions that are represented in the log. It can also filter out records that represent actions that are not of interest to system 104. Meeting join detection logic 166 detects meeting join actions where one user joined a meeting organized by another user. Messaging detection logic 168 detects messaging actions where one user sent an instant message to another user. User identifier logic 172 identifies the users involved in those collaborative actions, and multiple instance processing logic 170 identifies multiple instances of a similar collaborative action, among the same users, so that it is not inadvertently counted more than once. For instance, if user 116 schedules fifty meetings with user 120, this will be counted as one collaborative action between users 116 and 120. However, if user 116 generated fifty meetings with fifty unique users, then this will be identified as fifty different collaborative actions among user 116 and those fifty different users. Graph construction logic 174 then controls graph store 176 to store a representation of the graph.

Graph construction logic 174 then constructs a graph where nodes in the graph represent the users involved in the detected collaborative actions, and edges in the graph (which connect the nodes) represent collaborative actions between those two users. For instance, if user 116 sends an instant message to user 120, then one node in the graph will represent user 116 and another node in the graph will represent user 120. An edge connecting those two nodes will represent the collaborative action (text message) involving those two users. Graph construction logic 174 then controls graph store 176 to store a representation of the graph.

Centrality measure generator system 152 then generates a centrality measure or metric corresponding to each of the nodes in the graph. Therefore, connection identifier logic, 182 first identifies a number of edges that connect to each node. Connection metric generator logic 184 generates a connection metric, for each node, based upon the number of edges that connect to it. Inheritance processing logic 186 generates an inheritance value for each node, based upon the scores of the nodes to which it is connected. For instance, if the node corresponding to user 116 has a relatively high connection metric, meaning that it has a relatively large number of edges connected to it, and the node representing user 120 is connected to the node representing user 116, then the node representing user 120 will inherit a portion of the connection score corresponding to the node representing user 116. That portion of the score is identified by inheritance processing logic 186 as the metric inheritance value.

Centrality metric generator logic 188 then generates a centrality metric based upon the connection metric and the metric inheritance value for each node. PII scrubbing logic 190 removes any personal identifying information from the nodes, and normalization logic 192 normalizes the centrality metric corresponding to each node. The centrality metrics can be output to cross-system comparison logic 154 where the values for the various nodes in the graph representing the organization to which users 116 and 120 belong can be compared to values for nodes in graphs representing other organizations or tenants. The results of those comparisons, along with the centrality metrics generated by system 152, can be output to control signal generator 156. Control signal generator 156 illustratively generates control signals to control user interaction system 158 based upon those centrality metrics. For instance, it can control automated communication logic 196 to automatically send certain communications to various users, based upon the centrality metric generated for the node representing those users. Generator 156 can also generate control signals to control surfacing logic 198 to surface the information for an administrative user, or other users. Control signal generator 156 can also generate control signals to control user interaction computing and control system 104 to send certain communications to other systems 110, where they may be stored, or further processed.

Figure 2:
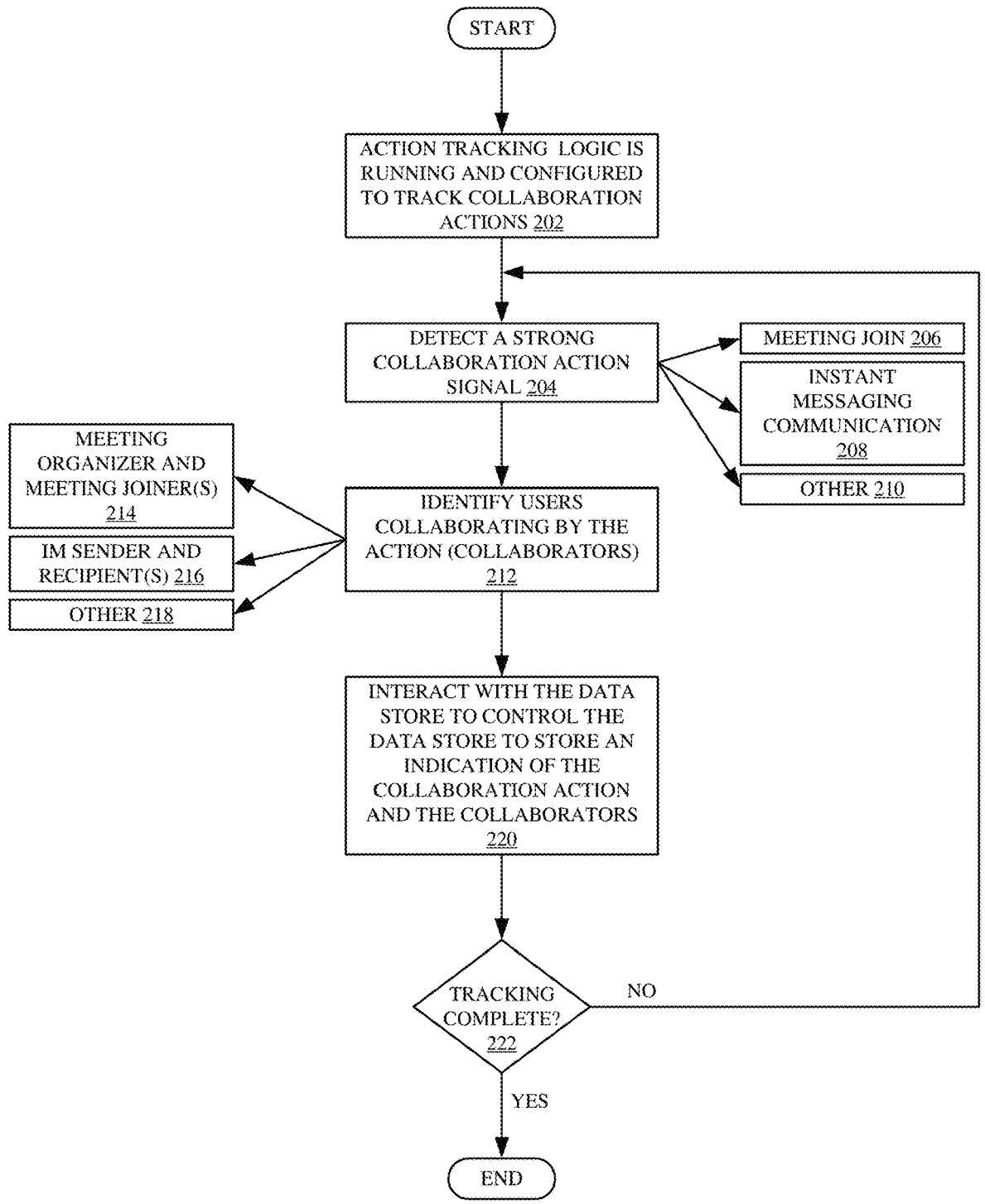
FIG. 2 is a flow diagram showing one example of the operation of the architecture illustrated in FIG. 1 in generating and storing collaborative action data.

FIG. 2 is a flow diagram illustrating one example of the operation of action tracking logic 130 in identifying strong collaboration actions among users, generating records indicative of those actions, and controlling data store 124 to store those records in action log 146. It is first assumed that action tracking logic 130 is running and is configured to detect and track collaboration actions. It will be appreciated that logic 130 can track a wide variety of additional actions as well, but, in one example, it at least tracks actions in which users send instant messages to one another, and in which they join meetings to which they are invited. This is indicated by block 202 in the flow diagram of FIG. 2.

Action detector 140 illustratively detects strong collaboration actions, as they occur. For instance, if user 116 uses messaging system 136 to send an instant message to user 120, then action detector 140 detects this action. This can be done, for instance, by receiving a signal from messaging system 136 indicating that an instant message has been sent from one user to another. It can be done by receiving a notification, from a separate notification system. It can be done in other ways as well. Action detector 140 also illustratively detects meeting join operations, such as when user 120 joins a meeting organized by user 116, using meeting system 126. This can also be done by receiving a meeting join signal from meeting system 126, indicating the meeting join action. It can be done by receiving a notification from a separate notification system, indicating that user 120 has joined the meeting. It can be done in other ways as well. Detecting a strong collaboration action signal is indicated by block 204 in the flow diagram of FIG. 2 Detecting a meeting join action is indicated by block 206. Detecting an instant messaging communication is indicated by block 208. The actions can include other actions as well, and this is indicated by block 210.

As part of detecting the strong collaboration actions, action detector 140 also illustratively detects which users are collaborating by the action (e.g., it detects the collaborators). This is indicated by block 212. In one example, when action detector 140 detects a meeting join action, it also identifies the meeting organizer and the user who is joining the meeting (the meeting joiner). This is indicated by block 214. When detector 140 detects an instant message, it detects the message sender and a message recipient(s). This is indicated by block 216. It can identify the collaborators in other ways as well, and this is indicated by block 218.

Once the strong collaboration action is detected, and once the collaborators are identified, then data store interaction logic 142 illustratively controls data store 124 to store an indication of the collaboration action and the collaborators in action log 146. This is indicated by block 220.

If action tracking logic 130 has completed its operation, then, the operation illustrated in FIG. 2 is complete. If not, processing reverts to block 204, where action tracking logic 130 continues to track strong collaboration actions. This is indicated by block 222 in the flow diagram of FIG. 2.

Figure 3:
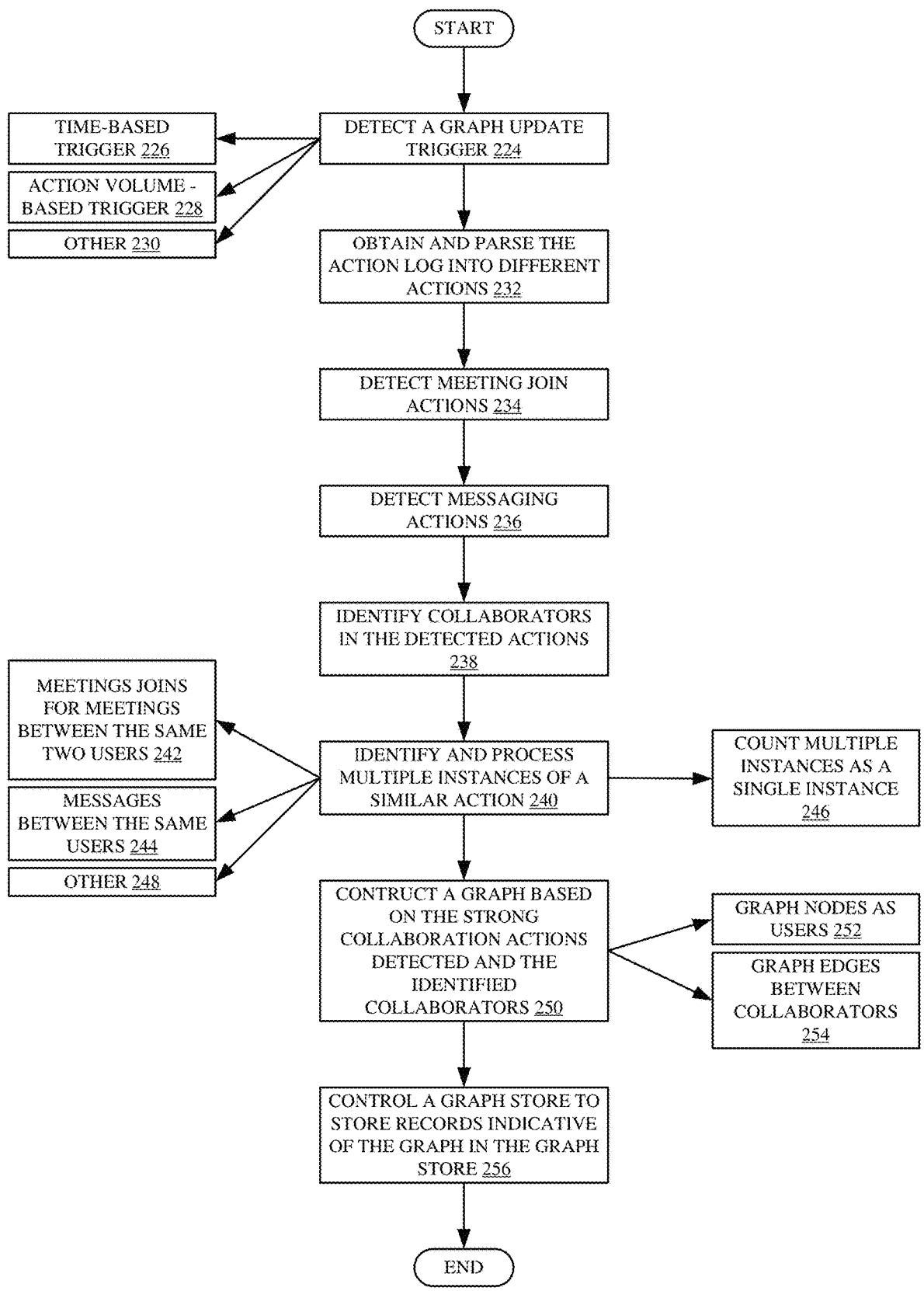
FIG. 3 is a flow diagram illustrating one example of the architecture illustrated in FIG. 1 in detecting collaborative actions and constructing a graph based upon the detected collaborative actions.

FIG. 3 is a flow diagram illustrating one example of the operation of collaborative action detection system 150 (in user interaction computing and control system 104) in processing collaborative actions to construct a graph. It will first be noted that system 150 can construct and update graphs continuously, on a periodic basis, intermittently, or based on a wide variety of other triggers. For instance, a trigger may be based on the volume of collaborative actions that have been logged in cloud service computing system 102. When a sufficient volume of those actions have been logged, this may trigger collaborative action detection system 150 to construct or update a graph. Thus, it is first assumed that update trigger detection logic 162 detects a graph construction or update trigger indicating that it is time construct or update a graph. This is indicated by block 224 in the flow diagram of FIG. 3. As discussed above, the trigger can be a time-based trigger, as indicated by block 226. It can be an action volume-based trigger, as indicated by block 228. It can be any of a wide variety of other triggers as well, and this is indicated by block 230.

Once triggered, log parsing logic 164 obtains information from action log 146 that identifies the various actions that have been detected and stored by action tracking logic 130. It illustratively parses log 146 into individual records for the individual actions that have been logged. It can also filter out actions that may be logged, but that are not needed for graph construction. By way of example, log 146 may include data records indicating that one user has sent an e-mail to another user. Since this type of action is not indicative of a strong collaboration between the users, this type of action may be filtered out by log parsing logic 164. Other actions can be filtered out as well. Obtaining and parsing the action log into different actions (and filtering) is indicated by block 232 in the flow diagram of FIG. 3.

In one example, meeting join detection logic 166 then detects meeting join actions in the parsed data. This is indicated by block 234. Messaging detection logic 168 illustratively detects messaging actions in which users have sent one another instant messages. This is indicated by block 236.

User identifier logic 172 identifies the collaborators in the detected actions. This can be done by accessing the information in action logic 146 corresponding to the detected actions. Identifying the collaborators is indicated by block 238 in the flow diagram of FIG. 3.

Multiple instance processing logic 170 then detects multiple instances of an action that are only to be counted as a single action. For instance, assume that users 116 and 120 have sent one another fifty different instant messages. Because this only indicates a strong collaboration between the users 116 and 120, those multiple instances of the strong collaboration action will be identified as a single strong collaboration action by multiple instance processing logic 170. Assume that user 116 has joined twenty different meetings organized by user 120. These multiple different collaboration actions will also be counted as a single collaboration action by multiple instance processing logic 170. Identifying and processing multiple instances of a similar action is indicated by block 240. Identifying multiple instances as meeting joins for multiple meetings between the same two users is indicated by block 242. Identifying multiple instances as multiple instant messages between the same users is indicated by block 244. Counting the multiple instances as a single strong collaborative action is indicated by block 246. The multiple instances can be identified and processed in other ways as well, and This is indicated by block 248.

Once the actions and users have been identified, graph construction logic 174 constructs a representation of a graph based on the strong collaboration actions detected and the identified collaborators. This is indicated by block 250 in the flow diagram of FIG. 3. In the graph, graph nodes illustratively represent the users, and the edges between those nodes represent the collaboration actions. Constructing the graph with graph nodes representing users is indicated by block 252, and having graph edges represent actions between the users is indicated by block 254.

It will also be noted that the collaborators may include more than two people for any given strong collaboration action that is detected. For instance, if a meeting organizer sends a meeting request to five different users, and all five of those users join the meeting, then an edge will be created between the meeting organizer and each of the different users who joined the meeting. However, no edge will be created between the other users that joined the meeting, themselves. This is because joining a meeting organized by an organizer indicates a stronger collaboration between the joiner and the organizer than it does between the joiner and other users who also join the meeting. Similarly, if a user sends and instant message to five other users, then an edge will be created between the sender and each of the recipients of the instant message. However, no edge will be created among the recipients, themselves, based on that instant message. Again, this is because sending an instant message to a user indicates a relatively strong collaboration action between the sender and recipient, but it does not necessarily indicate a strong collaboration action among a group of recipients.

Graph construction logic 174 then controls graph store 176 to store the representation of the graph that it has been constructed. This may include storing a plurality of different records that are linked by pointers, or the data structure can take a wide variety of other forms, so that it represents the graph. Controlling data store 176 to store the representation of the graph is indicated by block 256.

Figure 4:
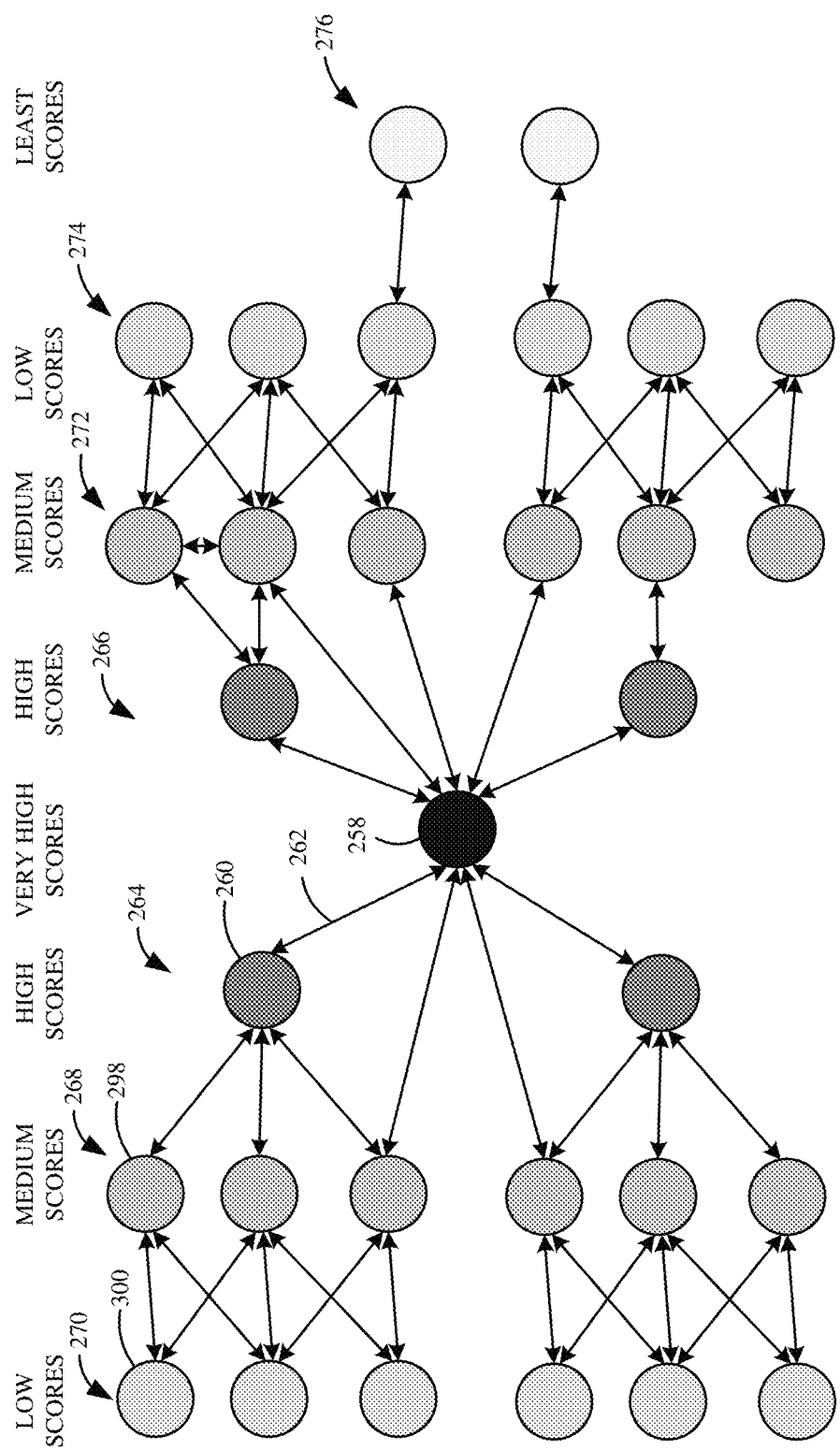
FIG. 4 is a diagram illustrating one example of a graph.

FIG. 4 is a depiction of one example of a graph structure. In the example shown in FIG. 4, the nodes are represented by circles, and the edges are represented by the lines connecting the circles. Each of the nodes represents a user. For instance, node 258 illustratively represents user 116, and node 260 illustratively represents user 120. The edge 262 connecting nodes 258 and 260 represents a strong collaborative action that was detected between those users. It will also be appreciated that FIG. 4 may represent only a partial graph in that not every edge is illustrated, but it is a representation of a graph structure only.

The graph structure can be arranged in a variety of different ways. It can be seen in FIG. 4 that node 258 represents a highly connected user because it has a relatively large number of edges connecting to it FIG. 4 also shows that the nodes can be arranged in columns that are displaced from the central node 258 (corresponding to the most highly connected user). The nodes in columns 264 and 266 represent users that are closer to the center node 258. The graph also shows additional columns of user's nodes 268, 270, 272, 274 and 276. In FIG. 4, the nodes located furthest from center node 258 are those which correspond to the least connected users.

Figure 5A:
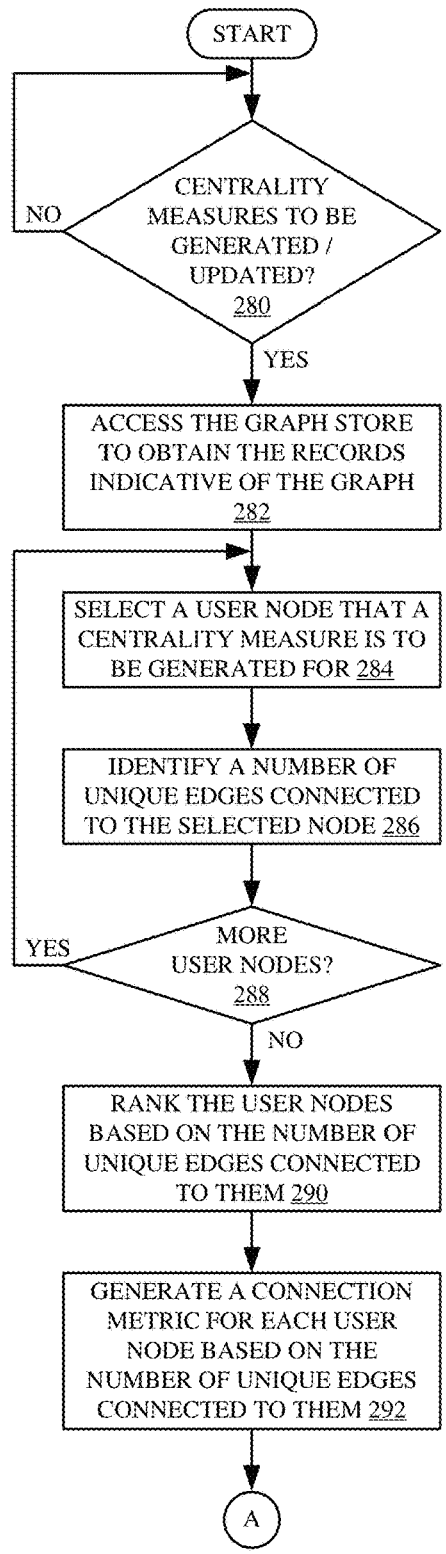
FIGS. 5A and 5B (collectively referred to herein as FIG. 5) illustrate a flow diagram showing one example of the operation of the architecture illustrated in FIG. 1 in generating a centrality metric for each node in the graph, and for generating a control signal based upon the centrality metric.
Figure 5B:
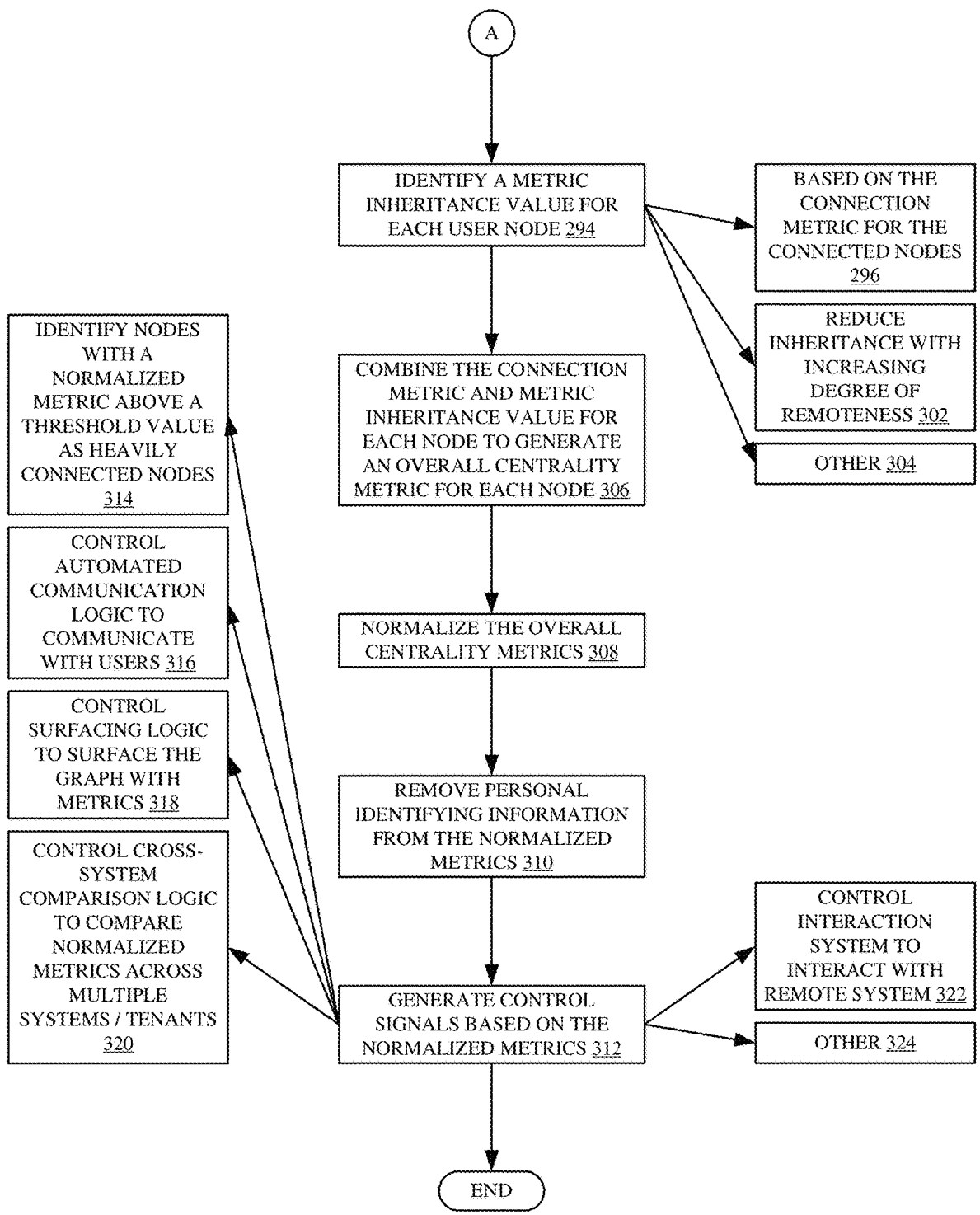

FIGS. 5A and 5B (collectively referred to herein as FIG. 5) illustrate a flow diagram showing one example of the operation of user interaction computing and control system 104 in generating a centrality measure for each node in the graph and for generating a control signal to control cloud service computing system 102 or other portions of architecture 100, based upon the centrality metric. Centrality measure generator system 152 first determines whether it is time to generate or update centrality measures for the nodes in a graph. This is indicated by block 280 in the flow diagram of FIG. 5. If so, connection identifier logic 182 accesses the graph for which centrality measures are to be generated or updated, in graph store 176. It illustratively obtains the records representative of the graph structure for which the measures are to be generated or updated. Accessing the graph store 176 is indicated by block 282 in the flow diagram of FIG. 5.

Connection generator logic 184 then generates a connection metric for each of the nodes in the graph, for which a centrality measure is to be generated. In doing so, it selects a node (such as node 258 in FIG. 4) to begin generating the centrality measure. Selecting a node is indicated by block 284 in the flow diagram of FIG. 5. Connection metric generator logic 184 then identifies a number of connections (or edges) connected to the selected node. This is indicated by block 286. It continues to count the number of edges for each node that is to be processed. By way of example, node 258 has nine edges connected to it. Logic 184 selects each node and identifies the number of edges connected to each node, for all nodes that are to be processed. This is indicated by block 288 in the flow diagram of FIG. 5.

Logic 184 can also illustratively rank the user nodes based on the number of unique edges connected to them. This is indicated by block 290. It then generates a connection metric for each node, based upon the number of unique edges connected to each node. This is indicated by block 292. In one example, the connection metric can simply be the number of unique edges connected to the node. In another example, it can be generated based on a function of that number of connections, or based on another algorithm that considers the number of connections in generating the connection metric.

Also, as discussed above, nodes in the graph structure can inherit scores from the nodes to which they are connected. Therefore, inheritance processing logic 186 identifies a metric inheritance value for each node to be processed. This is indicated by block 294 in the flow diagram of FIG. 5. In one example, the portion of a metric that is inherited by a given node is based on the metric value for nodes to which it is connected. For instance, again referring to FIG. 4, assume that node 258 has a high connection metric value and node 260 has a somewhat lower connection metric value. In that case, node 260 will include an additive inheritance metric value, which will be added to its score, because it is connected to node 258 which has a higher metric value. Identifying the metric inheritance value for a node under consideration based upon the connection metric for the nodes that are connected to the node under consideration is indicated by block 296.

Also, in one example, nodes can obtain an inheritance metric value from other nodes, even though they are not directly connected to the other nodes. It can be seen that node 298 is connected to node 258, through node 260. In that case, node 298 is said to be more remote from node 258 but may obtain an inheritance metric value from both node 258 and from node 260. However, the size of the inheritance metric value that node 298 receives from node 258 is substantially smaller than the size of the inheritance metric value it will receive from node 260. For instance, it may be that node 298 receives 10% of the metric value of node 260, as its inheritance metric value. On the other hand, it may receive only 1% of the metric value of node 258, because it is displaced from node 258 by node 260 (e.g., it is more remote from node 258 than from node 260).

The amount by which the inheritance metric value decreases, as the remoteness of the connection between two nodes increases, can take a wide variety of different forms. In one example, the amount or proportion of the inheritance metric value from one node to another decreases exponentially with the level of remoteness of the connection. Again, by way of example, it may be that node 260 inherits 10% of the score of node 258 and node 298 inherits 1% of the score of node 258, while node 300 may inherit 0.1% of the score of node 258. These are examples only. Reducing the inheritance with increasing degree of remoteness is indicated by block 302 in the flow diagram of FIG. 5. The metric inheritance value can be identified in other ways as well, and this is indicated by block 304.

Centrality metric generator logic 188 then combines the connection metric generated by connection generator logic 184, with the metric inheritance value, identified by inheritance processing logic 186, to obtain an overall centrality metric for each node. This is indicated by block 306. The combination can be an additive combination, or the combination can be done according to a different formula or algorithm as well.

Normalizing logic 192 then normalizes the centrality metric for each node. This can be done so that the scores of different tenants or organizations can be compared with one another (such as on an industry-wide basis, or in other ways). Normalizing the overall centrality metric is indicated by block 308 in the flow diagram of FIG. 5.

Personal identifying information scrubbing logic 190 then scrubs all of the personal identifying information (PII) form the normalized metrics. This is indicated by block 310. In one example, the nodes are all still uniquely identifiable, but, after scrubbing, they cannot be tied to the identity of an individual person. This can be done for the sake of security or privacy, or for other reasons. In other examples, the PII scrubbing operation can be omitted.

The uniquely identifiable overall centrality metrics, are provided to cross-system comparison logic 154 and to control signal generator 156. Control signal generator logic 156 generates control signals to control user interaction system 158, based upon the uniquely identifiable overall centrality metrics for a given tenant or organization. Generating control signals based upon the normalized metrics is indicated by block 312. There are a wide variety of different ways to do this. In one example, control signal generator 156 identifies all of the nodes with a normalized metric above a threshold value as being heavily connected nodes. This is indicated by block 314. Certain control operations can be performed for heavily connected nodes, and not for the remainder of the nodes, or vice versa. For instance, in one example, control signal generator 156 can control automated communication logic 196 to communicate with users corresponding to the heavily connected nodes. This is indicated by block 316. It will be appreciated that, because the nodes are uniquely identifiable, it may be that automated communication logic 196 knows which user to send the communication to, but that user is not identifiable to a person viewing the information, because the PII information has been scrubbed. In another example, the PII information is not scrubbed so different users can identify the heavily connected users as well.

In another example, control signal generator 156 controls surfacing logic 198 to surface a representation of the graph, with the nodes having the normalized metrics associated with them. This is indicated by block 318. In this way, even if the PII information has been scrubbed, a user viewing the information can identify how many heavily connected users are in the tenant or organization, or they can see other information contained by the graph as well.

In another example control signal generator 156 controls cross-system comparison logic 154 to compare the normalized metric values across multiple systems, organizations or tenants. This is indicated by block 320. In that way, the comparison can identify how the users of a certain organization compare to users of another organization (because the scores have been normalized). Control operations can be performed based on that comparison as well. By way of example, certain users in user interaction system 158 can be controlled to communicate with certain users in multiple different organizations, based upon their overall, normalized centrality metrics.

In another example, control signal generator 156 controls automated communication logic 196 to interact with one or more other, remote systems 110. Remote systems 110, as discussed above, can be remote storage systems or document management systems, they can be remote analysis systems where further analysis is performed, they can be notification systems where notifications are raised for support personnel, or they can be other systems as well. Controlling interaction with remote systems 110 is indicated by block 322 in the flow diagram of FIG. 5. It will also be noted that control signal generator 156 can generate control signals to perform a wide variety of other operations as well. This is indicated by block 324.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
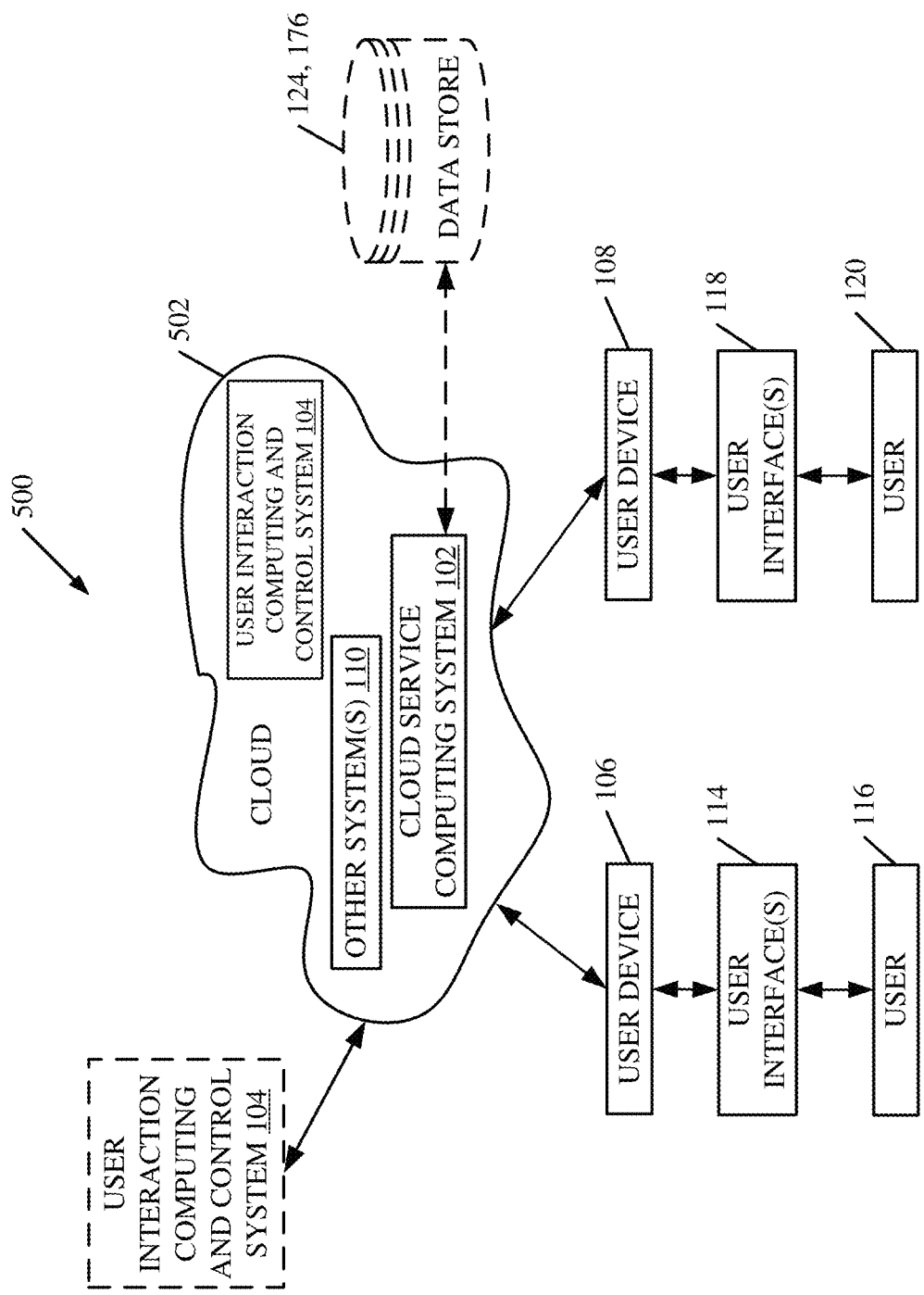
FIG. 6 is a block diagram showing one example of the architecture illustrated in FIG. 1, deployed in a cloud computing architecture.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that computing systems 102, 104, and 110 can be located in cloud 502 (which can be public, private, or a combination where portions are public while others are private). Therefore, users 116 and 120 use user devices 106 and 108 to access those systems through cloud 502.

FIG. 6 also depicts another example of a cloud architecture. FIG. 6 shows that it is also contemplated that some computing systems can be disposed in cloud 502 while others are not. By way of example, data stores 124, 176 can be disposed outside of cloud 502, and accessed through cloud 502. In another example, computing system 104 (or other items) can be outside of cloud 502. Regardless of where they are located, they can be accessed directly by the other items through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
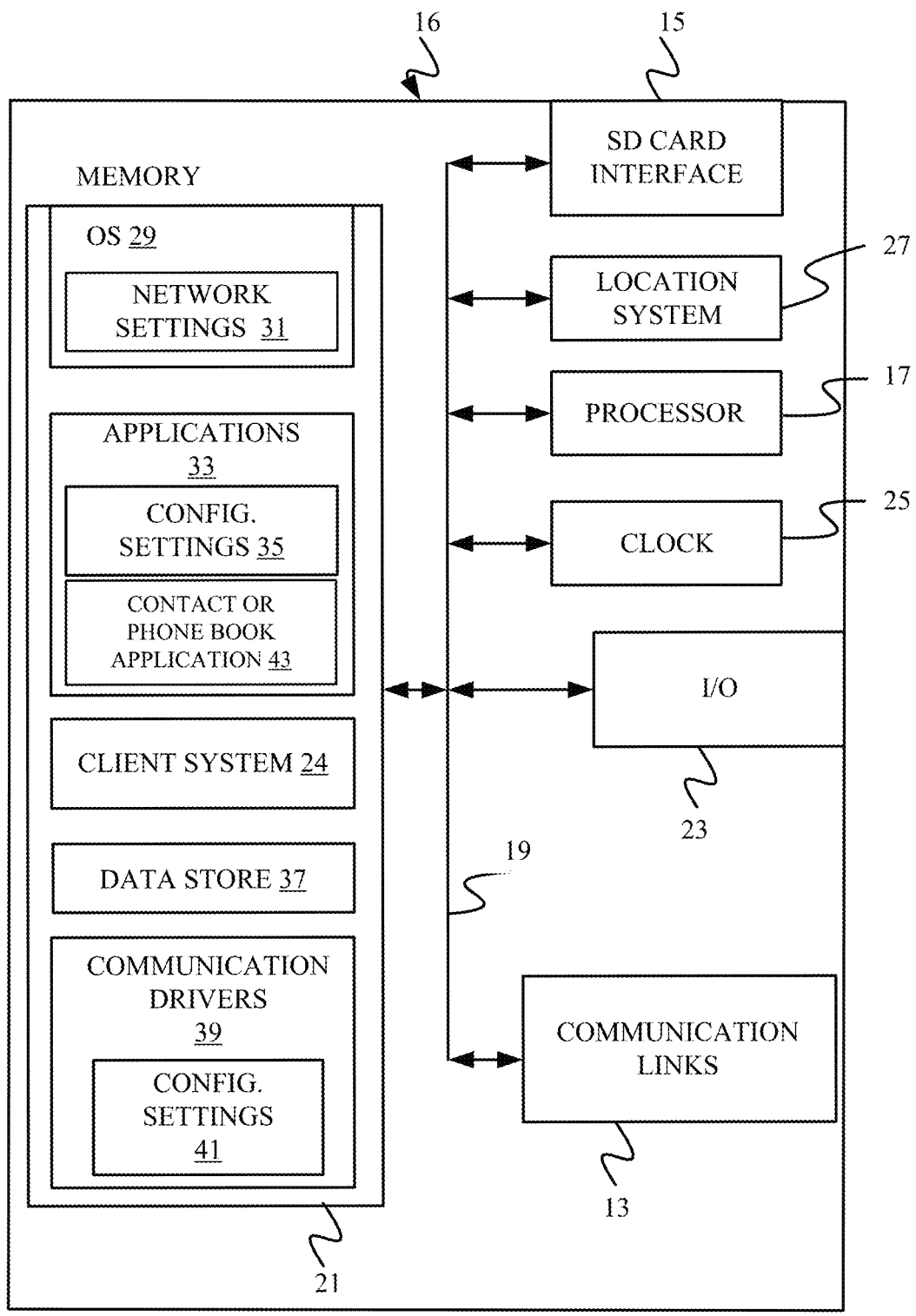
FIGS. 7-9 show examples of mobile devices that can be used in the architectures shown in the previous figures.
Figure 8:
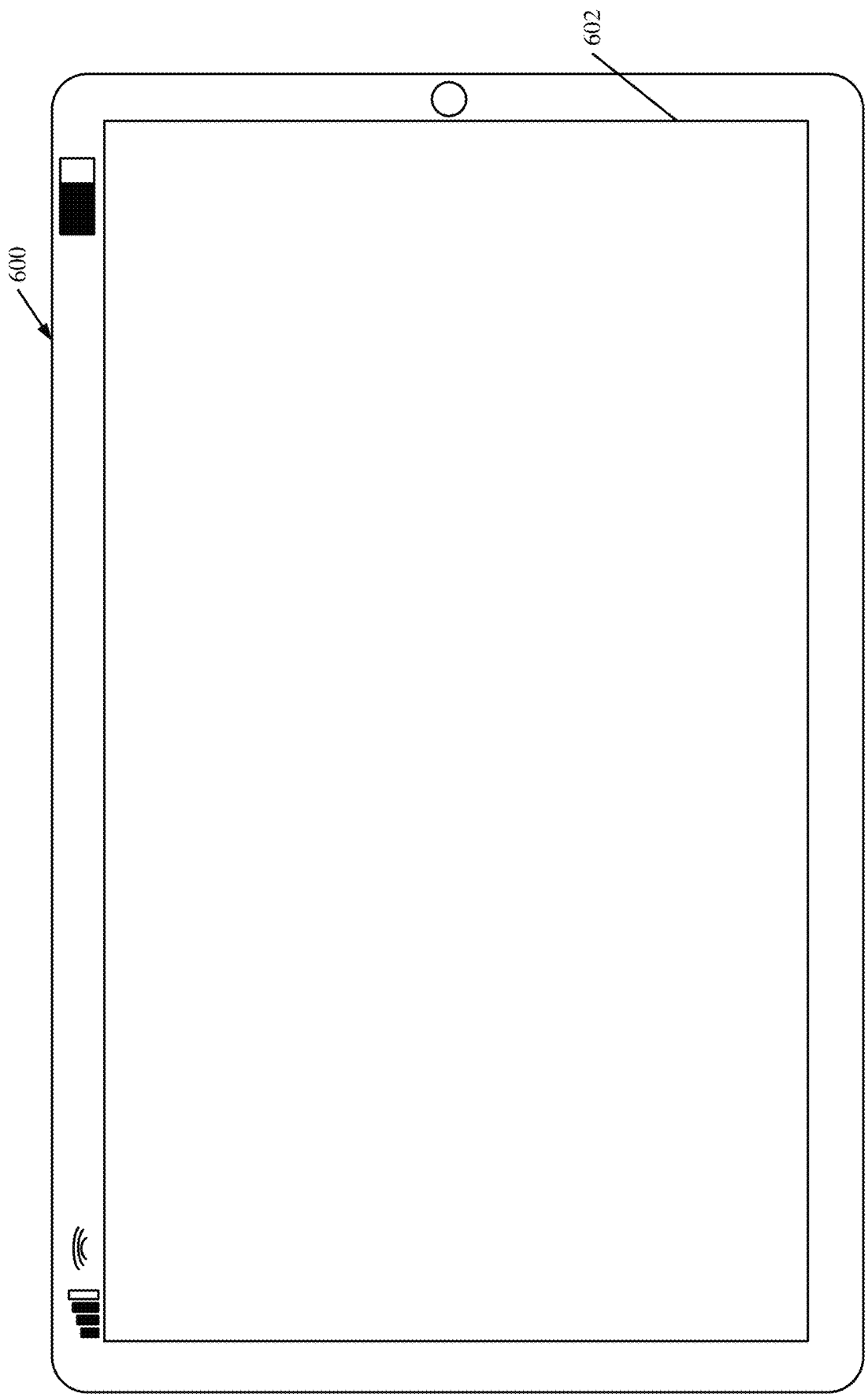
Figure 9:
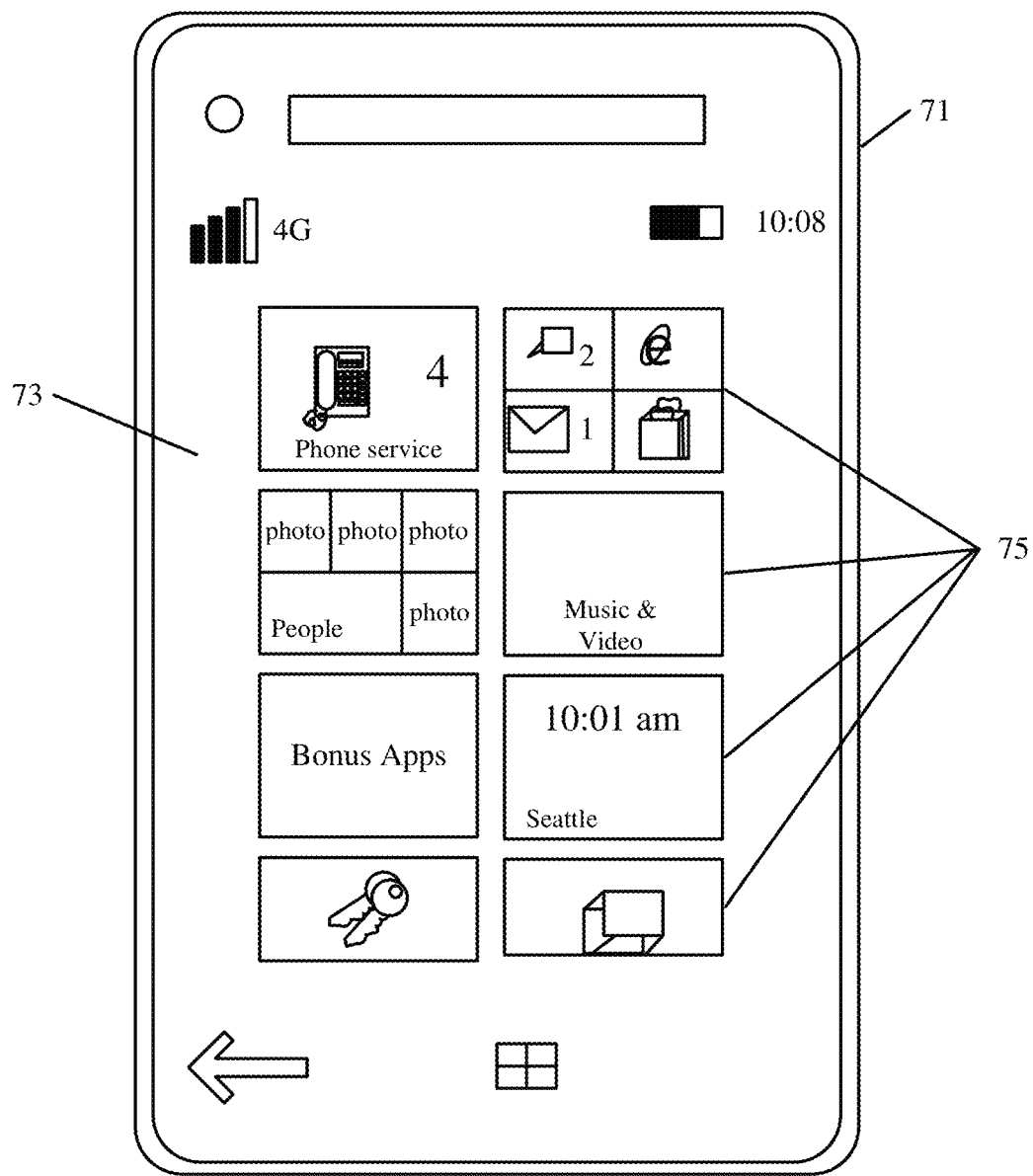

FIG. 7 is a simplified block diagram of one illustrative example of a handheld or mobile computing device that can be used as a user's or client's handheld device 16, in which the present system (or parts of it) can be deployed. FIGS. 8-9 are examples of handheld or mobile devices.

FIG. 7 provides a general block diagram of the components of a client device 16 that can run components computing system 102 or user devices 106, 108 or system 104 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 8 shows one example in which device 16 is a tablet computer 600. In FIG. 8, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
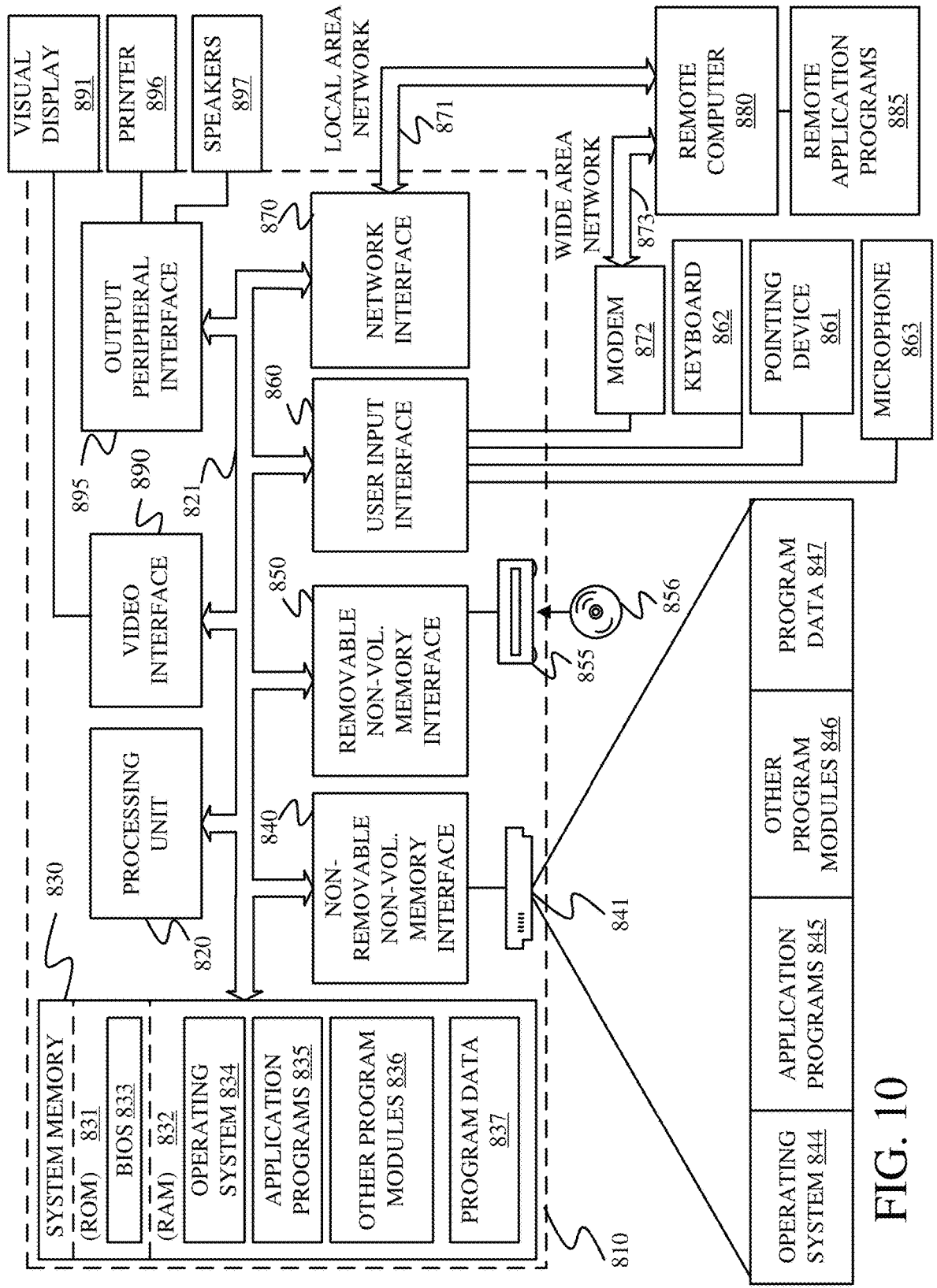
FIG. 10 is a block diagram showing one example of a computing environment that can be used in the architectures shown in the previous figures.

FIG. 10 is one example of a computing environment in which architecture 100, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:
a collaborative action detection system that identifies a set of collaborative actions among a plurality of different users of a cloud service computing system;
graph construction logic that generates a representation of a graph having nodes connected by edges, each node representing a user of the plurality of users and each edge connecting a pair of nodes corresponding to a collaborative action between users represented by the pair of nodes connected by the edge;
a centrality metric generator system that generates a centrality metric corresponding to each node, the centrality metric for each given node being based on a number of edges connected to the given node;
a user interaction system that controls communication with the plurality of different users; and
a control signal generator that controls the user interaction system based on the centrality metric corresponding to the nodes representing the plurality of different users.

Example 2 is the computing system of any or all previous examples wherein the collaborative action detection system comprises:
meeting join logic configured to identify, as a collaborative action between a first user of the plurality of users and a second user of the plurality of users, a meeting join action in which the first user joined a meeting organized by the second user.

Example 3 is the computing system of any or all previous examples wherein the collaborative action detection system comprises:
messaging detection logic configured to identify, as a collaborative action between the first user and the second user, an instant message action in which the first user sent an instant message to the second user.

Example 4 is the computing system of any or all previous examples wherein the collaborative action detection logic comprises:
parsing logic configured to access action records indicative of detected actions among the plurality of different users of the cloud service computing system and to filter out action records, other than records representing meeting join actions and instant message actions, to identify the set of collaborative actions.

Example 5 is the computing system of any or all previous examples and further comprising:

multiple instance processing logic configured to identify multiple instances of a collaborative action between the first user and the second user and to control the graph construction logic to generate only one edge between the nodes representing the first and second users based on the multiple instances of the collaborative action.

Example 6 is the computing system of any or all previous examples wherein the centrality metric generator system comprises:

connection metric generator logic configured to generate a connection metric for each given node, the connection metric for each given node being based on the number of edges connected to the given node; and inheritance processing logic configured to generate a metric inheritance value for each given node based on a connection metric for a node connected to the given node.

Example 7 is the computing system of any or all previous examples wherein the centrality metric generator system comprises:

centrality metric generator logic configured to combine the connection metric and the metric inheritance value for each given node to generate the centrality metric corresponding to each node.

Example 8 is the computing system of any or all previous examples wherein the centrality metric generator system comprises:

normalization logic configured to normalize the centrality metric corresponding to each node.

Example 9 is the computing system of any or all previous examples wherein the plurality of different users are users at a first tenant and further comprising:

cross-system comparison logic configured to compare the normalized centrality metrics for the users of the first tenant with centrality metrics for users of a second tenant and generate a comparison signal indicative of the comparison, the control signal generator being configured to control the user interaction system based on the comparison signal.

Example 10 is the computing system of any or all previous examples wherein the user interaction system comprises:

automated communication logic configured to automatically generate communications to a set of users based on the centrality metrics.

Example 11 is a computer implemented method, comprising:

detecting a set of collaborative actions among a plurality of different users of a cloud service computing system;

filtering the set of collaborative actions to identify, as a filtered set of collaborative actions, meeting join actions and instant message actions, a meeting join action between a first user and a second user indicating that the first user joined a meeting organized by the second user and an instant message action between the first user and the second user indicating that the first user sent an instant message to the second user;

generating a representation of a graph having nodes connected by edges, each node representing a user of the plurality of different users and each edge, connecting a pair of nodes, corresponding to a collaborative action, in the filtered set of collaborative actions, between users represented by the pair of nodes connected by the edge;

generating a centrality metric corresponding to each node, the centrality metric for each given node being based on a number of edges connected to the given node; and controlling a user interaction system to communicate with the plurality of different users based on the centrality metric corresponding to the nodes representing the plurality of different users.

Example 12 is the computer implemented method of any or all previous examples wherein detecting a set of collaborative actions comprises:

accessing an action store that has records indicative of actions; and identifying, as a collaborative action between the first user of the plurality of users and the second user of the plurality of users, a meeting join action; and identifying, as a collaborative action between the first user and the second user, an instant message action.

Example 13 is the computer implemented method of any or all previous examples wherein generating the centrality metric comprises:

generating a connection metric for each given node, the connection metric for each given node being based on the number of edges connected to the given node; and generating a metric inheritance value for each given node based on a connection metric for a node connected to the given node.

Example 14 is the computer implemented method of any or all previous examples wherein generating the centrality metric comprises:

combining the connection metric and the metric inheritance value for each given node to generate the centrality metric corresponding to each node.

Example 15 is the computer implemented method of any or all previous examples wherein generating the centrality metric comprises:

normalizing the centrality metric corresponding to each node.

Example 16 is the computer implemented method of any or all previous examples wherein the plurality of different users are users at a first tenant and further comprising:

controlling a comparison system to compare the normalized centrality metrics for the users of the first tenant with centrality metrics for users of a second tenant; and generating a comparison signal indicative of the comparison, wherein controlling the user interaction system comprises controlling the user interaction system based on the comparison signal.

Example 17 is the computer implemented method of any or all previous examples wherein controlling the user interaction system comprises:

controlling automated communication logic to automatically generate communications to a set of users based on the centrality metrics.

Example 18 is a computing system, comprising:

a collaborative action detection system that identifies a set of collaborative actions among a plurality of different users of a cloud service computing system;

parsing logic configured to filter out actions, from the set of collaborative actions, other than meeting join actions, in which a first user joins a meeting organized by a second user, and instant message actions, in which the first user sends an instant message to the second user, to identify a filtered set of collaborative actions;

graph construction logic that generates a representation of a graph having nodes connected by edges, each node representing a user of the plurality of users and each edge connecting a pair of nodes corresponding to a collaborative action, of the filtered set of collaborative actions, between users represented by the pair of nodes connected by the edge;

a centrality metric generator system that generates a centrality metric corresponding to each node, the centrality metric for each given node being based on a number of edges connected to the given node;

a user interaction system that controls communication with the plurality of different users; and a control signal generator that controls the user interaction system based on the centrality metric corresponding to the nodes representing the plurality of different users.

Example 19 is the computing system of any or all previous examples wherein the centrality metric generator system comprises:

connection metric generator logic configured to generate a connection metric for each given node, the connection metric for each given node being based on the number of edges connected to the given node;

inheritance processing logic configured to generate a metric inheritance value for each given node based on a connection metric for a node connected to the given node; and centrality metric generator logic configured to combine the connection metric and the metric inheritance value for each given node to generate the centrality metric corresponding to each node.

Example 20 is the computing system of any or all previous examples wherein the plurality of different users are users at a first tenant and wherein the centrality metric generator system comprises:

normalization logic configured to normalize the centrality metric corresponding to each node; and cross-system comparison logic configured to compare the normalized centrality metrics for the users of the first tenant with centrality metrics for users of a second tenant and generate a comparison signal indicative of the comparison, the control signal generator being configured to control the user interaction system based on the comparison signal.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
    a collaborative action detection system that identifies a set of collaborative actions among a plurality of different users of a cloud service computing system;
    graph construction logic that generates a representation of a graph having nodes connected by edges,
        each node representing a user of the plurality of users, and
        each edge comprising a connection between a pair of nodes, the edge corresponding to a collaborative action between users represented by the pair of nodes connected by the edge;
    a centrality metric generator system that generates a centrality metric corresponding to each node, the centrality metric for each given node being based on a number of edges connected to the given node;
    a user interaction system that controls communication with the plurality of different users; and
    a control signal generator that generates a control signal that controls the user interaction system to interact with one or more users based on the centrality metric corresponding to the nodes representing the plurality of different users.

2. The computing system of claim 1 wherein the collaborative action detection system comprises:
    meeting join logic configured to identify, as a collaborative action between a first user of the plurality of users and a second user of the plurality of users, a meeting join action in which the first user joined a meeting organized by the second user.

3. The computing system of claim 2 wherein the collaborative action detection system comprises:
    messaging detection logic configured to identify, as a collaborative action between the first user and the second user, an instant message action in which the first user sent an instant message to the second user.

4. The computing system of claim 1 wherein the collaborative action detection logic comprises:
    parsing logic configured to access action records indicative of detected actions among the plurality of different users of the cloud service computing system and to filter out action records, other than records representing meeting join actions and instant message actions, to identify the set of collaborative actions.

5. The computing system of claim 4 and further comprising:
    multiple instance processing logic configured to identify multiple instances of a collaborative action between the first user and the second user and to control the graph construction logic to generate only one edge between the nodes representing the first and second users based on the multiple instances of the collaborative action.

6. The computing system of claim 4 wherein the centrality metric generator system comprises:
    connection metric generator logic configured to generate a connection metric for each given node, the connection metric for each given node being based on the number of edges connected to the given node;
    inheritance processing logic configured to generate a metric inheritance value for each given node based on a connection metric for a node connected to the given node; and
    centrality metric generator logic configured to combine the connection metric and the metric inheritance value for each given node to generate the centrality metric corresponding to each node.

7. The computing system of claim 6 wherein the centrality metric generator system comprises:
    normalization logic configured to normalize the centrality metric corresponding to each node.

8. The computing system of claim 7 wherein the user interaction system comprises surfacing logic, and the control signal generator controls the surfacing logic to surface, to the one or more users, a representation of the graph and the associated centrality metrics.

9. The computing system of claim 7 wherein the plurality of different users are users at a first tenant and further comprising:
    cross-system comparison logic configured to compare the normalized centrality metrics for the users of the first tenant with centrality metrics for users of a second tenant and generate a comparison signal indicative of the comparison, the control signal generator being configured to control the user interaction system based on the comparison signal.

10. The computing system of claim 1 wherein
the user interaction system comprises automated communication logic; and
control signal generator controls the automated communication logic to automatically generate a communication to of the one or more users based on the centrality metrics.

11. A computer implemented method, comprising:
detecting a set of collaborative actions among a plurality of different users of a cloud service computing system;
filtering the set of collaborative actions to identify, as a filtered set of collaborative actions, meeting join actions and instant message actions, a meeting join action between a first user and a second user indicating that the first user joined a meeting organized by the second user and an instant message action between the first user and the second user indicating that the first user sent an instant message to the second user;
generating a representation of a graph having nodes connected by edges, each node representing a user of the plurality of different users and each edge, connecting a pair of nodes, corresponding to a collaborative action, in the filtered set of collaborative actions, between users represented by the pair of nodes connected by the edge;
generating a centrality metric corresponding to each node, the centrality metric for each given node being based on a number of edges connected to the given node; and
controlling a user interaction system to communicate with the plurality of different users based on the centrality metric corresponding to the nodes representing the plurality of different users.

12. The computer implemented method of claim 11 wherein detecting a set of collaborative actions comprises:
accessing an action store that has records indicative of actions; and
identifying, as a collaborative action between the first user of the plurality of users and the second user of the plurality of users, a meeting join action; and
identifying, as a collaborative action between the first user and the second user, an instant message action.

13. The computer implemented method of claim 12 wherein generating the centrality metric comprises:
generating a connection metric for each given node, the connection metric for each given node being based on the number of edges connected to the given node; and
generating a metric inheritance value for each given node based on a connection metric for a node connected to the given node.

14. The computer implemented method of claim 13 wherein generating the centrality metric comprises:
combining the connection metric and the metric inheritance value for each given node to generate the centrality metric corresponding to each node.

15. The computer implemented method of claim 14 wherein generating the centrality metric comprises:
normalizing the centrality metric corresponding to each node.

16. The computer implemented method of claim 15 wherein the plurality of different users are users at a first tenant and further comprising:
controlling a comparison system to compare the normalized centrality metrics for the users of the first tenant with centrality metrics for users of a second tenant; and
generating a comparison signal indicative of the comparison, wherein controlling the user interaction system comprises controlling the user interaction system based on the comparison signal.

17. The computer implemented method of claim 16 wherein controlling the user interaction system comprises:
controlling automated communication logic to automatically generate communications to a set of users based on the centrality metrics.

18. A computing system, comprising:
a collaborative action detection system that identifies a set of collaborative actions among a plurality of different users of a cloud service computing system;
parsing logic configured to filter out actions, from the set of collaborative actions, other than meeting join actions, in which a first user joins a meeting organized by a second user, and instant message actions, in which the first user sends an instant message to the second user, to identify a filtered set of collaborative actions;
graph construction logic that generates a representation of a graph having nodes connected by edges,
each node representing a user of the plurality of users, and
each edge comprising a connection between a pair of nodes, the edge corresponding to a collaborative action, of the filtered set of collaborative actions, between users represented by the pair of nodes connected by the edge;
a centrality metric generator system that generates a centrality metric corresponding to each node, the centrality metric for each given node being based on a number of edges connected to the given node;
a user interaction system that controls communication with the plurality of different users; and
a control signal generator that generates a control signal that controls the user interaction system to interact with one or more users based on the centrality metric corresponding to the nodes representing the plurality of different users.

19. The computing system of claim 18 wherein the centrality metric generator system comprises:
connection metric generator logic configured to generate a connection metric for each given node, the connection metric for each given node being based on the number of edges connected to the given node;
inheritance processing logic configured to generate a metric inheritance value for each given node based on a connection metric for a node connected to the given node; and
centrality metric generator logic configured to combine the connection metric and the metric inheritance value for each given node to generate the centrality metric; corresponding to each node.

20. The computing system of claim 19 wherein the plurality of different users are users at a first tenant and wherein the centrality metric generator system comprises:
normalization logic configured to normalize the centrality metric corresponding to each node, and
cross-system comparison logic configured to compare the normalized centrality metrics for the users of the first tenant with centrality metrics for users of a second tenant and generate a comparison signal indicative of the comparison, the control signal generator being configured to control the user interaction system based on the comparison signal.

* * * * *